United States Patent
Haddad et al.

(10) Patent No.: US 7,167,639 B2
(45) Date of Patent: Jan. 23, 2007

(54) DIGITAL VIDEO RECORDER USING CIRCULAR FILE MANAGEMENT AND METHOD OF OPERATION

(75) Inventors: Semir S. Haddad, San Jose, CA (US); Michael J. Jones, Lincoln, CA (US)

(73) Assignee: STMicroelectronics, Inc., Carrollton, TX (US)

(*) Notice: Subject to any disclaimer, the term of this patent is extended or adjusted under 35 U.S.C. 154(b) by 1081 days.

(21) Appl. No.: 09/943,791

(22) Filed: Aug. 31, 2001

(65) Prior Publication Data

US 2003/0044170 A1   Mar. 6, 2003

(51) Int. Cl.
*H04N 5/85* (2006.01)
(52) U.S. Cl. ...................................... 386/125
(58) Field of Classification Search ............ 360/32, 360/64; 386/1, 83, 125, 46, 96; 348/1, 6, 348/8, 10; 711/109, 110, 39, 117; 381/17, 381/41; 395/514, 872, 873; 725/39, 48, 725/55, 56, 89, 92, 115, 145
See application file for complete search history.

(56) References Cited

U.S. PATENT DOCUMENTS

| | | | |
|---|---|---|---|
| 5,371,551 A | 12/1994 | Logan et al. | |
| 5,438,423 A | 8/1995 | Lynch et al. | |
| 6,378,035 B1* | 4/2002 | Parry et al. | 711/110 |
| 6,434,748 B1* | 8/2002 | Shen et al. | 725/89 |
| 6,788,882 B1* | 9/2004 | Geer et al. | 386/116 |

FOREIGN PATENT DOCUMENTS

| | | |
|---|---|---|
| EP | 0 762 756 A2 | 3/1997 |
| WO | WO 96/33579 | 10/1996 |

\* cited by examiner

*Primary Examiner*—Thai Tran
*Assistant Examiner*—Mishawn Dunn
(74) *Attorney, Agent, or Firm*—Lisa K. Jorgenson; William A. Munck

(57) ABSTRACT

There is disclosed a digital video recorder that uses a circular file management system to efficiently manage time-shifted viewing a live video broadcast television program. There is provided for use in the digital video recorder, an apparatus for performing time-shifted viewing of an incoming television program being received by the digital video recorder. The apparatus comprises a controller capable of creating a data file having a defined maximum size on a storage disk of the digital video recorder and capable of causing video data associated with the incoming television program to be stored sequentially in the data file from a first location to an Nth location. The controller, in response to a determination that the video data has been stored in the Nth location, causes a next received video data to be stored in the first location.

23 Claims, 2 Drawing Sheets

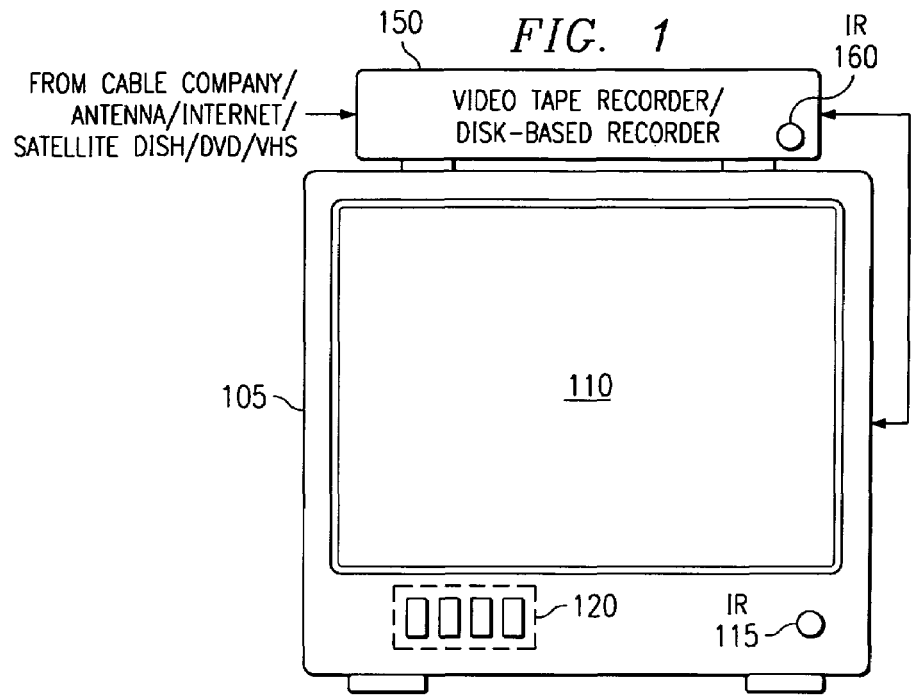

DIGITAL VIDEO RECORDER USING CIRCULAR FILE MANAGEMENT AND METHOD OF OPERATION

CROSS-REFERENCE TO RELATED APPLICATIONS

The present invention is related to those disclosed in the following U.S. patent applications:
1. Ser. No. 09/943,837, filed concurrently herewith, entitled "SYSTEM FOR MULTIPLEXING VIDEO DATA STREAMS IN A DIGITAL VIDEO RECORDER AND METHOD OF OPERATING THE SAME;"
2. Ser. No. 09/943,815, filed concurrently herewith, entitled "APPARATUS AND METHOD FOR INDEXING MPEG VIDEO DATA TO PERFORM SPECIAL MODE PLAYBACK IN A DIGITAL VIDEO RECORDER";
3. Ser. No. 09/944,729, filed concurrently herewith, entitled "SYSTEM FOR DETECTING START CODES IN MPEG VIDEO STREAMS AND METHOD OF OPERATING THE SAME;"
4. Ser. No. 09/943,793, filed concurrently herewith, entitled "APPARATUS AND METHOD FOR SYNCHRONIZING VIDEO AND AUDIO MPEG STREAMS IN A VIDEO PLAYBACK DEVICE."

The above applications are commonly assigned to the assignee of the present invention. The disclosures of these related patent applications are hereby incorporated by reference for all purposes as if fully set forth herein.

Technical Field of the Invention

The present invention is generally directed to digital video recorder devices and, more specifically, to a digital video recorder (DVR) that uses circular files to store digital video programs.

BACKGROUND OF THE INVENTION

Digital video recorder (DVR) systems are becoming increasingly popular with consumers. Digital video recorder systems use magnetic hard disk drives rather than magnetic cassette tapes to store video programs. For example, the ReplayTV™ recorder and the TiVO™ recorder record television programs in digital formats on hard disk drives using, for example, MPEG-2 compression. Also, some DVR systems may record on a readable/writable digital versatile disk (DVD) rather than a magnetic disk.

One advantage that a digital video recorder system has over a conventional video cassette recorder is time-shifted viewing. Time shifting occurs when a user watches a live broadcast with a delay. This may occur, for example, when the user presses the Pause button on the DVR system to answer a phone call and a few moments later resumes viewing the live broadcast. During the pause period, the DVR system continues to record the live broadcast television (TV) program on the hard disk drive, but the screen is frozen at the part of the TV program where the Pause button was pressed. When the user presses the Pause button again (or, alternatively, presses the Play button), the DVR system plays back the recorded TV program from the disk drive from the point at which the TV program was paused.

In this manner, the user views the live broadcast program with some delay period. The user may catch up to the live broadcast by pressing Fast Forward (which plays stored video back at faster than normal speed) or by pressing Skip (which skips sections of stored video). However, if the user continues to watch the delayed TV program at normal speed and does not catch up to the live broadcast, the live TV program continues to be recorded to the disk drive and then played back.

However, when a file system is used to control the disk drive, each recorded television program is saved as a data file on the disk drive. Unfortunately, conventional file management techniques are inefficient when it comes to time-shifted viewing. This is because the file management system must simultaneously write (store) the live broadcast to the data file and read (retrieve) the delayed television program from the data file.

There is therefore a need in the art for an improved digital video recorder (DVR) system capable of time-shifted viewing. In particular, there is a need for a digital video recorder (DVR) system having a file management system that can efficiently implement time-shifted viewing.

SUMMARY OF THE INVENTION

To address the above-discussed deficiencies of the prior art, it is a primary object of the present invention to provide a digital video recorder that uses a circular file management system to efficiently manage time-shifted viewing of a live video broadcast television program. There is provided, for use in a digital video recorder, an apparatus for performing time-shifted viewing of an incoming television program being received by the digital video recorder. According to an advantageous embodiment of the present invention, the apparatus comprises a controller capable of creating a data file having a defined maximum size on a storage disk of the digital video recorder and capable of causing video data associated with the incoming television program to be stored sequentially in the data file from a first location to an Nth location. The controller, in response to a determination that the video data has been stored in the Nth location, causes a next received video data to be stored in the first location.

According to one embodiment of the present invention, the controller uses a write pointer to cause the video data to be stored sequentially in the data file from the first location to the Nth location.

According to another embodiment of the present invention, the controller updates the write pointer each time the video data is stored to a location in the data file to thereby cause the video data to be stored sequentially in the data file from the first location to the Nth location.

According to still another embodiment of the present invention, the controller determines that the video data has been stored in the Nth location when the write pointer is equal to a value associated with the defined maximum size.

According to yet another embodiment of the present invention, the controller causes the next received video data to be stored in the first location by resetting the write pointer to a value associated with the first memory location.

According to a further embodiment of the present invention, the controller is further capable of causing stored video data to be retrieved sequentially from the data file from the first location to the Nth location.

According to a still further embodiment of the present invention, the controller, in response to a determination that the stored video data has been retrieved from the Nth location, causes a next stored video data to be retrieved from the first location.

According to a yet further embodiment of the present invention, the controller uses a read pointer to cause the stored video data to be retrieved sequentially from the data file from the first location to the Nth location.

In another embodiment of the present invention, the controller updates the read pointer each time the stored video data is retrieved from a location in the data file to thereby cause the stored video data to be retrieved sequentially from the data file from the first location to the Nth location.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation"; the term "or", is inclusive, meaning "and/or"; the phrases "associated with" and "associated therewith", as well as derivatives thereof, may mean "include", "be included within", "interconnect with", "contain", "be contained within", "connect to or with", "couple to or with", "be communicable with", "cooperate with", "interleave", "juxtapose", "be proximate to", "be bound to or with", "have", "have a property of", or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1 illustrates an exemplary digital video recorder (DVR) system and a connected television set according to one embodiment of the present invention;

FIG. 2 illustrates the exemplary digital video recorder (DVR) system in greater detail according to one embodiment of the present invention.

DETAILED DESCRIPTION OF THE INVENTION

Figure 3:
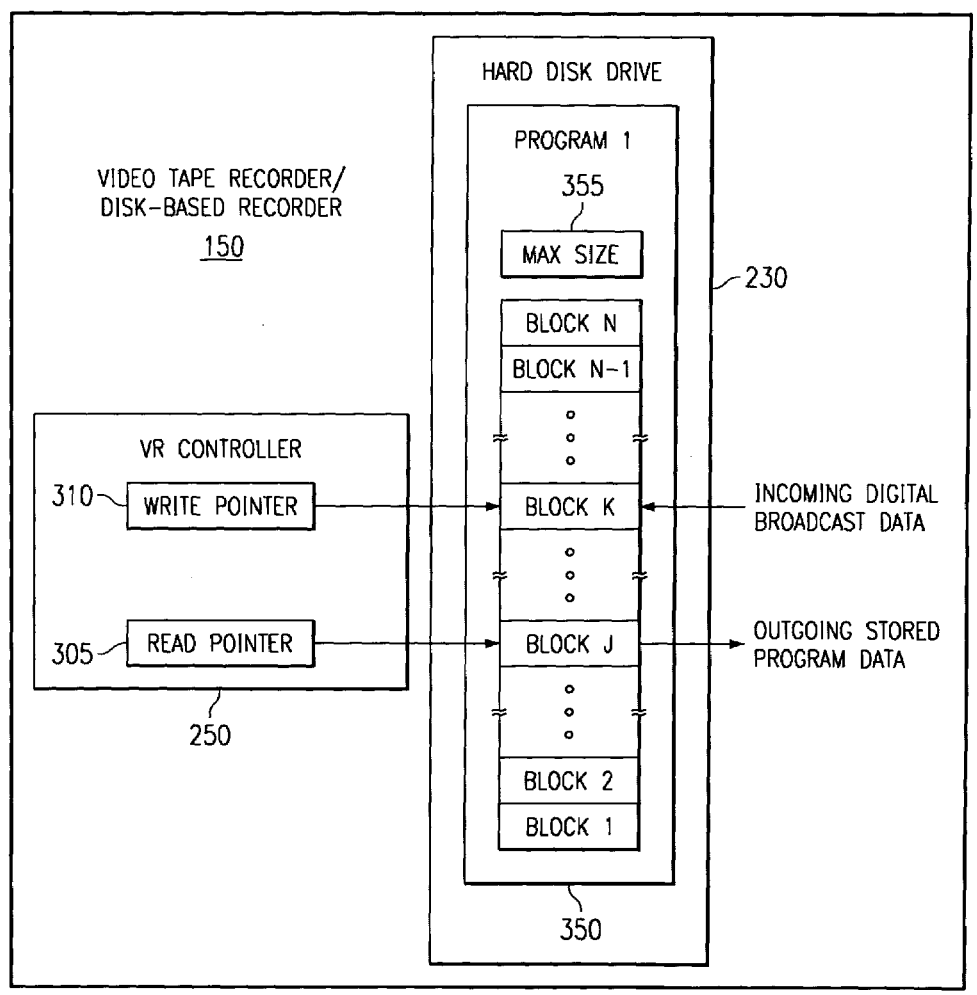
FIG. 3 illustrates selected portions of the exemplary video recorder controller and the exemplary hard disk drive in greater detail according to one embodiment of the present invention.

FIGS. 1 through 3, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged video recorder system.

FIG. 1 illustrates exemplary digital video recorder (DVR) system 150 and television set 105 according to one embodiment of the present invention. Digital video recorder system 150 receives incoming television signals from an external source, such as a set-top box of a cable television service provider (Cable Co.) or the phone company, a local antenna, the Internet, a satellite television service provider, or an attached DVD or VHS tape player, and transmits a viewer-selected channel to television set 105. In RECORD mode, digital video recorder system 150 may demodulate an incoming radio frequency (RF) television signal to produce a baseband video signal that is recorded and stored on a storage medium within or connected to video playback device 150. In PLAY mode, digital video recorder system 150 retrieves a stored baseband video signal (i.e., program) selected by the user from the storage medium and transmits the retrieved program to television set 105.

According to an exemplary embodiment of the present invention, digital video recorder (DVR) system 150 is a disk drive-based device, such as a ReplayTV™ recorder or a TiVO™ recorder, DVR system 150 stores and retrieves the incoming television signals to and from a computer magnetic hard disk rather than a magnetic cassette tape. In still other embodiments, video playback device 150 may store and retrieve from a local read/write (R/W) digital versatile disk (DVD) or R/W CD-ROM. Thus, the local storage medium may be fixed (e.g., hard disk drive) or removable (e.g., DVD, CD-ROM).

Digital video recorder system 150 comprises infrared (IR) sensor 160 that receives commands (such as Channel Up, Channel Down, Volume Up, Volume Down, Record, Play, Fast Forward (FF) Reverse, and the like) from a remote control device operated by the viewer. Television set 105 is a conventional television comprising screen 110, infrared (IR) sensor 115, and one or more manual controls 120 (indicated by a dotted line). IR sensor 115 also receives commands (such as volume up, volume down, power ON/OFF) from a remote control device operated by the viewer.

It should be noted that DVR system 150 is not limited to receiving a particular type of incoming television signal from a particular type of source. As noted above, the external source may be a cable service provider, a conventional RF broadcast antenna, a satellite dish, an Internet connection, or another local storage device, such as a DVD player. Thus, the incoming signal may be a conventional digital signal, such as MPEG-2, an conventional NTSC analog signal, or digital Internet protocol (IP) packets of any other communication protocol. However, for the purposes of simplicity and clarity in explaining the principles of the present invention, the descriptions that follow shall generally be directed to an embodiment in which DVR system 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

FIG. 2 illustrates exemplary digital video recorder (DVR) system 150 in greater detail according to one embodiment of the present invention. DVR system 150 comprises IR sensor 160, video processor 210, optional MPEG-2 encoder 220, hard disk drive 230, MPEG-2 decoder/NTSC encoder 240. DVR system 150 further comprises video buffer 260 and video recorder (VR) controller 250.

VR controller 250 directs the overall operation of DVR system 150, including View mode, Record mode, Play mode, Fast Forward (FF) mode, Reverse mode, Pause mode, and Skip mode, among others. In View mode, VR controller 250 causes the incoming television signal from the cable service provider to be demodulated and processed by video processor 210 and transmitted to television set 105, without storing or retrieving from hard disk drive 230.

The internal circuitry of DVR system 150 varies depending on whether the external broadcast signal received by DVR system 150 is digital, such as MPEG-2, or analog, such as NTSC. For example, if the external broadcast signal received from the cable service provider is an analog signal, video processor 210 may be, for example, a TriMedia(™) 1100 media processor, which contains radio frequency (RF) front-end circuitry for receiving incoming analog television signals, tuning to a user-selected channel, and converting the selected RF signal to a baseband television signal (e.g., super video signal) suitable for display on television set 105. Video processor 210 also is capable of receiving a conventional NTSC, PAL or SECAM signal from MPEG2 decoder/NTSC encoder 240 (after buffering in video buffer 260) during Play mode and transmitting baseband television signal (e.g., super video signal) to television set 105. Alternatively, if the external broadcast signal is a digital signal, such as an MPEG-2 signal, video processor 210 may be a conventional digital TV decoder, such as an MPEG-2 decoder, that converts the digital input signal to a baseband television signal for display on television set 105.

In Record mode, VR controller 250 causes the incoming television signal to be stored on hard disk drive 230. MPEG-2 encoder 220 is optional provided if the external broadcast signal is an analog signal. For example, under the control of VR controller 250, MPEG-2 encoder 220 may receive an incoming NTSC-type analog television signal and convert the received broadcast signal to MPEG-2 format for storage on hard disk drive 230. Alternatively, if the external broadcast signal is already a digital signal, such as MPEG-2, then the broadcast signal may be stored directly to hard disk drive 230 and MPEG-2 may be omitted. In Play mode, VR controller 250 directs hard disk drive 230 to stream the stored television signal (i.e., program) to MPEG-2 decoder/NTSC encoder 240, which converts the MPEG-2 data from hard disk drive 230 to, for example, a super video (S-Video) signal that is buffered in video buffer 260 before video processor 210 transmits it to television set 105.

It should be noted that the choice of the MPEG-2 standard for MPEG-2 encoder 220 and MPEG-2 decoder/NTSC encoder 240 is by way of illustration only. In alternate embodiments of the present invention, the MPEG encoder and decoder may comply with one or more of the MPEG-1, MPEG-2, MPEG-4, and MPEG-7 standards. In still other alternate embodiments, the digital television encoding and decoding circuitry may comply with some other digital television standard.

For the purposes of this application and the claims that follow, hard disk drive 230 is defined to include any mass storage device that is both readable and writable, including conventional magnetic disk drives, and optical disk drives for read/write digital versatile disks (DVD-RW), re-writable CD-ROMs, and the like. In fact, hard disk drive 230 need not be fixed in the conventional sense that is permanently embedded in DVR system 150.

Rather, hard disk drive 230 includes any mass storage device that is dedicated to DVR system 150 for the purpose of storing recorded television programs. Thus, hard disk drive 230 may include an attached peripheral drive or removable disk drives (whether embedded or attached), such as a juke box device that holds read/write DVDs or re-writable CD-ROMs. Furthermore, in an advantageous embodiment of the present invention, hard disk drive 230 may include external mass storage devices that DVR system 150 may access and control via a network connection (e.g., Internet protocol (IP) connection), including, for example, a disk drive in a home personal computer (PC) or a disk drive on a server at an Internet service provider (ISP).

FIG. 3 illustrates selected portions of exemplary video recorder (VR) controller 250 and exemplary hard disk drive 230 in greater detail according to one embodiment of the present invention. VR controller 250 maintains read pointer value 305, which is used to retrieve program data from television program dat file 350 stored in hard disk drive 230. Television program data file 350, which may be one of several program stored on hard disk drive 230, is arbitrarily labeled PROGRAM 1. VR controller 250 also maintains write pointer value 310, which is used to store program data into television program data file 350 in hard disk drive 230.

Television program data file 350 also contains maximum (MAX) size data field 355, which contains a value defining the size (in kilobytes, megabytes, gigabytes) of television program data file 350. For the purposes of illustration only, video data is shown in television program data file 350 as being stored in, and retrieved from, up to accessible N locations in television program data file 350. These N locations are sequentially labeled Block 1 through Block N. In the illustrated example, write pointer value 310 contains the value K, which causes incoming digital broadcast data to be written to Block K in television program data file 350. Also, in the illustrated example, read pointer value 305 contains the value J, which causes outgoing stored program data (i.e., the time-shifted television program) to be retrieved from Block J in television program data file 350.

VR controller 250, which controls the operation of the file system management of hard disk drive 230, creates a new file (i.e., television program data file 350) in which the incoming broadcast TV program may be stored. This new file may be created whenever a new channel is tuned or, alternatively, whenever the user presses the Pause button during a broadcast. VR controller 250 may determine a maximum size data value to be stored in maximum size data field 355 according to a system default value or according to a user specified value. The maximum size data value determines the number of minutes of TV programs that can be stored after the user presses the Pause button for subsequent time-shifted viewing.

After television program data file 350 is created on hard disk drive 230, VR controller 250 causes the incoming live broadcast data to be stored in (i.e., written to) the location in television program data file 350 indicated by write pointer value 310. This may be accomplished by directing MPEG-2 encoder 220 to store the MPEG-2 data from the live broadcast television program into the location in television program data file 350 indicated by write pointer value 310. Thereafter, MPEG-2 encoder 220 may maintain and update the value of write pointer value 310 for subsequent write operations. Alternatively, VR controller 250 may direct hard disk drive 230 to store MPEG-2 data received from MPEG-2 encoder 220 or other digital data received from the service provider into the location in television program data file 350 indicated by write pointer value 310. Thereafter, hard disk drive 230 may maintain and update the value of write pointer value 310 for subsequent write operations.

The user views the time-shifted broadcast program by pressing the Pause button a second time or pressing the Play button. In either event, after the Pause button or the Play button is pressed, VR controller 250 causes the stored time-shifted broadcast data to be read (i.e., retrieved) from the location in television program data file 350 indicated by read pointer value 305. This may be accomplished by directing MPEG-2 decoder/NTSC encoder 240 to read the MPEG-2 data from the location in television program data file 350 indicated by read pointer value 305. Thereafter, MPEG-2 decoder/NTSC encoder 240 may maintain and update the value of read pointer value 305 for subsequent read operations. Alternatively, VR controller 250 may direct hard disk drive 230 to transfer to MPEG-2 decoder/NTSC encoder 240 the MPEG-2 data stored in the location in television program data file 350 indicated by read pointer value 305. Thereafter, hard disk drive 230 may maintain and update the value of read pointer value 310 for subsequent read operations.

According to the principles of the present invention, television program data file 350 is configured as a circular file that behaves as a circular buffer. The circular file characteristics are:

Open Function:

When a circular file is opened, maximum size data field 355 of the file (i.e., the maximum size of the circular buffer) must be specified. When television program data file 350 is initially opened, its actual size is automatically zero bytes, because the data that previously may have been in that file is now irrelevant.

Write Function:

1) The wraparound of television program data file 350 is managed by VR controller 250. When write pointer value 310 is equal to the value in maximum size data field 355, write pointer value 310 goes back to the beginning television program data file 350.
2) If write pointer value 310 reaches read pointer value 310 minus a Margin value, the write operation returns an error.
3) If write pointer value 310 reaches read pointer value 310, read pointer value 310 is automatically updated with write pointer value 310 plus a Margin value (priority of write over read).

Read Function:

1) End-of-file (EOF) is detected when read pointer value 310-write pointer value 310.
2) The wraparound of television program data file 350 is managed by VR controller 250. When read pointer value 310 is equal to the value in maximum size data field 355, then read pointer value 310 goes back to the beginning of television program data file 350.

Seek Function:

1) If the maximum size of the file has been written once, then read pointer value 310 can be set anywhere (i.e., by pressing Play or Skip buttons), provided that it is less than maximum size data field 355.
2) Otherwise, read pointer value 310 cannot be set greater than write pointer value 310.

Although the present invention has been described in detail, those skilled in the art should understand that they can make various changes, substitutions and alterations herein without departing from the spirit and scope of the invention in its broadest form.

What is claimed is:

1. For use in a digital video recorder, an apparatus for performing time-shifted viewing of an incoming television program being received by said digital video recorder, the apparatus comprising:

a controller capable of, in response to receipt of a pause command, creating a data file having a defined maximum size on a storage disk of said digital video recorder and capable of causing video data associated with said incoming television program to be stored sequentially in said data file from a first location to an Nth location, wherein said controller, in response to a determination that said video data has been stored in said Nth location, is capable of causing a next received video data to be stored in said first location.

2. The apparatus as set forth in claim 1 wherein said controller uses a write pointer to cause said video data to be stored sequentially in said data file from said first location to said Nth location.

3. The apparatus as set forth in claim 2 wherein said controller updates said write pointer each time said video data is stored to a location in said data file to thereby cause said video data to be stored sequentially in said data file from said first location to said Nth location.

4. The apparatus as set forth in claim 3 wherein said controller determines that said video data has been stored in said Nth location when said write pointer is equal to a value associated with said defined maximum size.

5. The apparatus as set forth in claim 4 wherein said controller causes said next received video data to be stored in said first location by resetting said write pointer to a value associated with said first memory location.

6. The apparatus as set forth in claim 1 wherein said controller is further capable of causing stored video data to be retrieved sequentially from said data file from said first location to said Nth location.

7. The apparatus as set forth in claim 6 wherein said controller, in response to a determination that said stored video data has been retrieved from said Nth location, causes a next stored video data to be retrieved from said first location.

8. The apparatus as set forth in claim 7 wherein said controller uses a read pointer to cause said stored video data to be retrieved sequentially from said data file from said first location to said Nth location.

9. The apparatus as set forth in claim 8 wherein said controller updates said read pointer each time said stored video data is retrieved from a location in said data file to thereby cause said stored video data to be retrieved sequentially from said data file from said first location to said Nth location.

10. A digital video recorder capable of time-shifted viewing of an incoming television program being received by said digital video recorder, said digital video recorder comprising:

a video processor capable of receiving said incoming television program and converting said incoming television program to a baseband video signal capable of being displayed on a television set coupled to said digital video recorder;

a storage disk for storing said incoming television program; and a controller capable of, in response to receipt of a pause command, creating on said storage disk a data file having a defined maximum size and capable of causing video data associated with said incoming television program to be stored sequentially in said data file from a first location to an Nth location, wherein said controller, in response to a determination that said video data has been stored in said Nth location, is capable of causing a next received video data to be stored in said first location.

11. The digital video recorder as set forth in claim 10 wherein said controller uses a write pointer to cause said video data to be stored sequentially in said data file from said first location to said Nth location.

12. The digital video recorder as set forth in claim 11 wherein said controller updates said write pointer each time said video data is stored to a location in said data file to thereby cause said video data to be stored sequentially in said data file from said first location to said Nth location.

13. The digital video recorder as set forth in claim 12 wherein said controller determines that said video data has been stored in said Nth location when said write pointer is equal to a value associated with said defined maximum size.

14. The digital video recorder as set forth in claim 13 wherein said controller causes said next received video data to be stored in said first location by resetting said write pointer to a value associated with said first memory location.

15. The digital video recorder as set forth in claim 10 wherein said controller is further capable of causing stored video data to be retrieved sequentially from said data file from said first location to said Nth location.

16. The digital video recorder as set forth in claim 15 wherein said controller, in response to a determination that said stored video data has been retrieved from said Nth location, causes a next stored video data to be retrieved from said first location.

17. The digital video recorder as set forth in claim 16 wherein said controller uses a read pointer to cause said stored video data to be retrieved sequentially from said data file from said first location to said Nth location.

18. The digital video recorder as set forth in claim 17 wherein said controller updates said read pointer each time said stored video data is retrieved from a location in said data file to thereby cause said stored video data to be retrieved sequentially from said data file from said first location to said Nth location.

19. For use in a digital video recorder, a method for performing time-shifted viewing of an incoming television program being received by the digital video recorder, the method comprising the steps of:
  in response to receipt of a pause command, creating a data file having a defined maximum size on a storage disk of the digital video recorder;
  storing video data from the incoming television program in the data file sequentially from a first location to an Nth location;
  determining whether video data has been stored in the Nth location; and
  in response to a determination that video data has been stored in the Nth location, storing a next received video data in the first location.

20. The method as set forth in claim 19 further comprising the step of retrieving stored video data sequentially from the data file from the first location to the Nth location.

21. The method as set forth in claim 20 further comprising the steps of:
  determining whether stored video data has been retrieved from the Nth location; and
  in response to a determination that video data has been retrieved from the Nth location retrieving a next stored video data from the first location.

22. The apparatus of claim 1, wherein the storage disk comprises a persistent storage disk.

23. The apparatus of claim 1, wherein the controller is capable of storing the defined maximum size in a data field associated with the data file.

* * * * *